United States Patent
Ge et al.

(10) Patent No.: US 10,053,064 B2
(45) Date of Patent: Aug. 21, 2018

(54) SYSTEM AND METHOD FOR CONTROLLING BRAKING OF AUTONOMOUS MACHINE

(71) Applicant: Caterpillar Inc., Peoria, IL (US)

(72) Inventors: Xinyu Ge, Peoria, IL (US); Hua Gu, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 43 days.

(21) Appl. No.: 15/236,752

(22) Filed: Aug. 15, 2016

(65) Prior Publication Data
US 2018/0043868 A1 Feb. 15, 2018

(51) Int. Cl.
| | |
|---|---|
| *B60T 7/16* | (2006.01) |
| *B60T 15/02* | (2006.01) |
| *B60T 8/17* | (2006.01) |
| *B60T 8/171* | (2006.01) |
| *B60T 8/18* | (2006.01) |
| *F02D 13/02* | (2006.01) |
| *F02D 13/04* | (2006.01) |
| *B60T 1/06* | (2006.01) |
| *B60T 7/22* | (2006.01) |

(52) U.S. Cl.
CPC ............ *B60T 7/16* (2013.01); *B60T 8/1701* (2013.01); *B60T 8/171* (2013.01); *B60T 8/18* (2013.01); *B60T 15/028* (2013.01); *F02D 13/0242* (2013.01); *F02D 13/04* (2013.01); *B60T 1/062* (2013.01); *B60T 7/22* (2013.01); *B60T 2201/022* (2013.01); *B60T 2210/36* (2013.01); *B60T 2250/02* (2013.01); *B60T 2260/04* (2013.01)

(58) Field of Classification Search
CPC .......... B60T 7/16; B60T 8/1701; B60T 8/171; B60T 8/18; B60T 15/028; B60T 2210/36; B60T 2250/02
USPC .......................................... 701/45
See application file for complete search history.

(56) References Cited

U.S. PATENT DOCUMENTS

| | | |
|---|---|---|
| 6,480,768 B1 | 11/2002 | Torii |
| 6,553,306 B2 | 4/2003 | Sayman |
| 7,223,206 B2 | 5/2007 | Eriksson et al. |
| 7,520,572 B2 * | 4/2009 | Hatipoglu ............... B60T 8/175 303/15 |

(Continued)

FOREIGN PATENT DOCUMENTS

| | | |
|---|---|---|
| JP | 2015188957 | 11/2015 |
| JP | 2015226094 | 12/2015 |
| WO | 2015147082 | 10/2015 |

*Primary Examiner* — Atul Trivedi
(74) *Attorney, Agent, or Firm* — Harrity & Harrity LLP (57) ABSTRACT

A braking system for controlling braking of a machine is disclosed. The braking system includes a first set of sensors to detect a first set of information indicative of operational characteristics of an engine and a transmission system. The braking system includes a second set of sensors to detect a second set of information indicative of a load of the machine and a profile of a work surface. The braking system includes a receiving unit to receive a third set of information indicative of a predefined route of the machine. The braking system includes a controller configured to control an actuator for opening and closing of an exhaust port for engine braking, and to control a valve for achieving a predetermined gear-ratio during the engine braking, based on the first set of information, the second set of information, and the third set of information.

20 Claims, 8 Drawing Sheets

(56) References Cited

U.S. PATENT DOCUMENTS

| | | | |
|---|---|---|---|
| 7,869,927 B2 | 1/2011 | Uematsu | |
| 8,019,514 B2 * | 9/2011 | Yuet | B60T 7/12 |
| | | | 340/438 |
| 8,070,651 B2 | 12/2011 | Eastman et al. | |
| 8,364,336 B2 * | 1/2013 | Richter | G01M 17/0078 |
| | | | 180/169 |
| 8,869,521 B2 | 10/2014 | Stephenson et al. | |
| 8,938,343 B2 | 1/2015 | Jensen | |
| 2006/0185459 A1 * | 8/2006 | Matsumura | F16D 48/064 |
| | | | 74/335 |
| 2009/0318263 A1 * | 12/2009 | Yuet | B60T 7/16 |
| | | | 477/92 |
| 2010/0030447 A1 * | 2/2010 | Smyth | B60W 10/06 |
| | | | 701/102 |
| 2013/0024090 A1 * | 1/2013 | Minase | B60W 30/1882 |
| | | | 701/102 |
| 2013/0296136 A1 * | 11/2013 | Doering | B60K 6/48 |
| | | | 477/167 |
| 2014/0032061 A1 * | 1/2014 | Wulf | F16H 63/42 |
| | | | 701/51 |
| 2014/0358400 A1 | 12/2014 | Whitney et al. | |

\* cited by examiner

SYSTEM AND METHOD FOR CONTROLLING BRAKING OF AUTONOMOUS MACHINE

TECHNICAL FIELD

The present disclosure relates to braking of a machine, and more particularly to a system and a method to control braking of the machine.

BACKGROUND

Heavy machines, such as vehicles, operating at various worksites experience dynamic operating conditions. Nowadays, such machines may be autonomously operated by establishing a communication with a central station, and therefore, do not need a human driver for operation while following fixed haulage routes. Such machines operating at a work site usually carry heavy loads (for example, above 250 tons) that may affect braking of the machines. Further, repeated usage of existing brakes (for example, disc brakes or drum brakes) leads to overheating of components of a braking mechanism and, eventually, may lead to excessive damage. In order to support the existing braking mechanism, engine braking is employed in the machines for ensuring a better experience of braking.

However, the engine braking demands a precise and controlled monitoring of an exhaust valve for ensuring an effective braking of the machine. The phenomenon of the engine braking leads to thermal stresses and mechanical stresses due to application of Joules-Thomson effect at an exhaust port of the engine. Further, while a typical transmission system of the machine is developed considering human habits and driving experience, a typical transmission system has not developed to accommodate the engine braking in the autonomous machines. Therefore, there may be issues with regard to gear-ratio during the engine braking. An improper gear-ratio or usage of the exhaust valve may result in less than optimum operation of the machine. Therefore, service life of the components of the machine may be significantly reduced. Consequently, this may result in ineffective operations, unnecessary downtime, and/or the like.

WIPO application number 2015/147082 (the '082 application) discloses an autonomous travel working vehicle. An autonomous travel working vehicle is provided with a position calculation means for measuring the position of a vehicle body using a satellite positioning system, and a control device for automatic travel and work along a set travel path. The position calculation means and the control device adjust the sensitivity of an obstacle detection means and improve detection accuracy. The autonomous travel working vehicle is also provided with an obstacle sensor, an alarm means, and a false report switch. In this regard, when an obstacle has been detected and an alarm has been issued, if an operator does not recognize the obstacle and activates the erroneous report switch, the control device cancels the alarm. However, the autonomous travel working vehicle of the '082 application does not disclose controlling engine braking.

SUMMARY OF THE DISCLOSURE

In one aspect of the present disclosure, a braking system for controlling braking of a machine is provided. The braking system includes a first set of sensors configured to detect a first set of information. The first set of information indicates operational characteristics of an engine and a transmission system of the machine. The braking system includes a second set of sensors configured to detect a second set of information. The second set of information indicates a load of the machine and a profile of a work surface, while the machine is traveling on a predefined route. The braking system includes a receiving unit configured to receive a third set of information. The third set of information indicates the predefined route of the machine. The braking system further includes a controller in communication with the first set of sensors, the second set of sensors, and the receiving unit. The controller is configured to control an actuator disposed in the engine. The actuator is configured to open and close an exhaust port during engine braking. The controller is configured to control a valve disposed in the transmission system. The valve is configured to achieve a predetermined gear-ratio during the engine braking. The actuator and the valve are controlled based on the first set of information, the second set of information, and the third set of information.

In another aspect of the present disclosure, a method for controlling braking of a machine is provided. The method includes detecting a first set of information by a first set of sensors. The first set of information indicates operational characteristics of an engine and a transmission system of the machine. The method includes detecting a second set of information by a second set of sensors. The second set of information indicates a load of the machine and a profile of a work surface, while the machine is traveling on a predefined route. The method includes receiving a third set of information by a receiving unit. The third set of information indicates the predefined route of the machine. The method includes controlling, by a controller, an actuator for controlling opening and closing of an exhaust port during engine braking. The actuator is disposed in the engine. The method further includes controlling, by the controller, a valve to achieve a predetermined gear-ratio during the engine braking. The valve is disposed in the transmission system. The actuator and the valve are controlled based on the first set of information, the second set of information, and the third set of information.

In yet another aspect of the present disclosure, a machine is provided. The machine includes an engine, a transmission system coupled to the engine, and a braking system in communication with the engine and the transmission system. The braking system includes a first set of sensors configured to detect a first set of information. The first set of information indicates operational characteristics of the engine and the transmission system of the machine. The braking system includes a second set of sensors configured to detect a second set of information. The second set of information indicates a load of the machine and a profile of a work surface, while the machine is traveling on a predefined route. The braking system includes a receiving unit configured to receive a third set of information. The third set of information indicates the predefined route of the machine. The braking system further includes a controller in communication with the first set of sensors, the second set of sensors, and the receiving unit. The controller is configured to control an actuator disposed in the engine. The actuator is configured to open and close an exhaust port during engine braking. The controller is configured to control a valve disposed in the transmission system. The valve is configured to achieve a predetermined gear-ratio during the engine braking. The actuator and the valve are controlled based on the first set of information, the second set of information, and the third set of information.

Other features and aspects of this disclosure will be apparent from the following description and the accompanying drawings.

DETAILED DESCRIPTION

Figure 1:
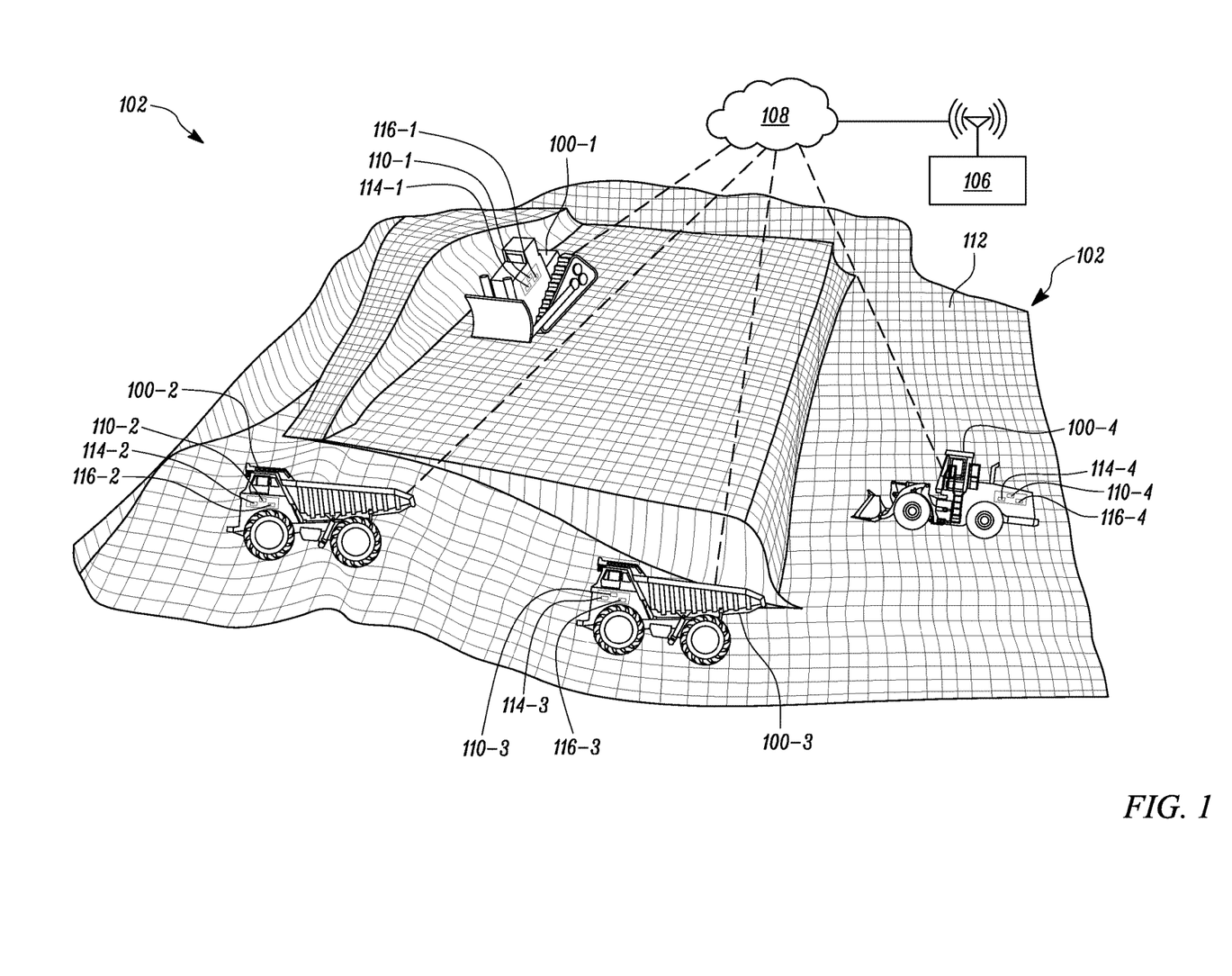
FIG. 1 is a schematic view of a plurality of machines working at a work site, according to one implementation of the present disclosure.

Wherever possible, the same reference numbers will be used throughout the drawings to refer to the same or the like parts. FIG. 1 illustrates a schematic view of a plurality of machines 100 (individually referred to as machine 100 or machine 100-1, machine 100-2, machine 100-3, and machine 100-4) operating at a work site 102, according to one embodiment of the present disclosure. In some implementations, the plurality of machines 100 may be operating in an autonomous manner. Therefore, the plurality of machines 100 may also be referred to as machines 100 or autonomous machines 100, without departing from the scope of the present disclosure. In some implementations, the machines 100 may be autonomous vehicles 100.

An autonomous vehicle 100 may be understood as a driverless vehicle or a self-driving vehicle which may be capable of navigating based on environmental factors, and without a human input. The machines 100 may include, but not limited to, articulating trucks, bulldozers, loaders, excavators, scrapers, shovels, dump trucks, and/or the like. In some implementations, the machines 100 may be autonomous trucks 100 operating at the work site 102. Further, the work site 102 may include, but not limited to, a mining site, a construction site, and/or the like.

The machines 100 may be travelling on predefined routes for performing operations at the work site 102. For example, in case the work site 102 is the mining site, the machines 100, such as dump trucks, usually follow predetermined paths from a digging location to a dumping location. The predefined routes may be generated based on various factors, which may include, but not limited to, operations to be performed at the work site 102, a sequence of the operations, availability of the machines 100, and/or the like. In some implementations, a route planning system 106, also referred to as route planner 106, may generate and assign the predefined routes to each of the machines 100. In some implementations, the route planning system 106 may be disposed in a central monitoring station (not shown).

In some implementations, the machines 100 may be in communication with the route planning system 106 through a network 108. The machines 100 may also be in communication with each other through the network 108. In some implementations, the network 108 may be a wireless network 108 (connecting the machines 100 with each other and with the route planning system 106) and/or a wired network 108.

The machines 100 may include, but not limited to, engines 114, transmission systems 116 coupled to the engines 114 for providing a predetermined gear-ratio to the machines 100, and braking systems 110. The engines 114 may individually be referred to as engine 114 or engine 114-1, engine 114-2, engine 114-3, and engine 114-4. As illustrated in FIG. 1, the machine 100-1, the machine 100-2, the machine 100-3, and the machine 100-4 may include the engine 114-1, the engine 114-2, the engine 114-3, and the engine 114-4, respectively. Further, the transmission systems 116 may individually be referred to as transmission system 116 or transmission system 116-1, transmission system 116-2, transmission system 116-3, and transmission system 116-4. As illustrated in FIG. 1, the machine 100-1, the machine 100-2, the machine 100-3, and the machine 100-4 may include the transmission system 116-1, the transmission system 116-2, the transmission system 116-3, and the transmission system 116-4, respectively. Similarly, the braking systems 110 may individually be referred to as braking system 110 or braking system 110-1, braking system 110-2, braking system 110-3, and braking system 110-4. As illustrated in FIG. 1, the machine 100-1, the machine 100-2, the machine 100-3, and the machine 100-4 may include the braking system 110-1, the braking system 110-2, the braking system 110-3, and the braking system 110-4, respectively.

For the sake of brevity and clarity, the present disclosure is explained with regard to one of the braking systems 110 (referred to as braking system 110) disposed in one of the plurality of machines 100 (referred to as machine 100), with the machine 100 including one of the engines 114 (referred to as engine 114) and one of the transmission systems 116 (referred to as transmission system 116). The braking system 110 may be configured to control braking of the machine 100.

The braking system 110 may be in communication with the engine 114 and the transmission system 116. In some implementations, the engine 114 may be a diesel engine. Further, the transmission system 116 may include gears and clutches which may selectively couple an input shaft (not shown) to an output shaft (not shown) to achieve a desired output speed ratio. The operational and constructional features of the braking system 110 are explained in the description of FIG. 2, FIG. 3, FIG. 4, FIG. 5, FIG. 6, and FIG. 7.

Figure 2:
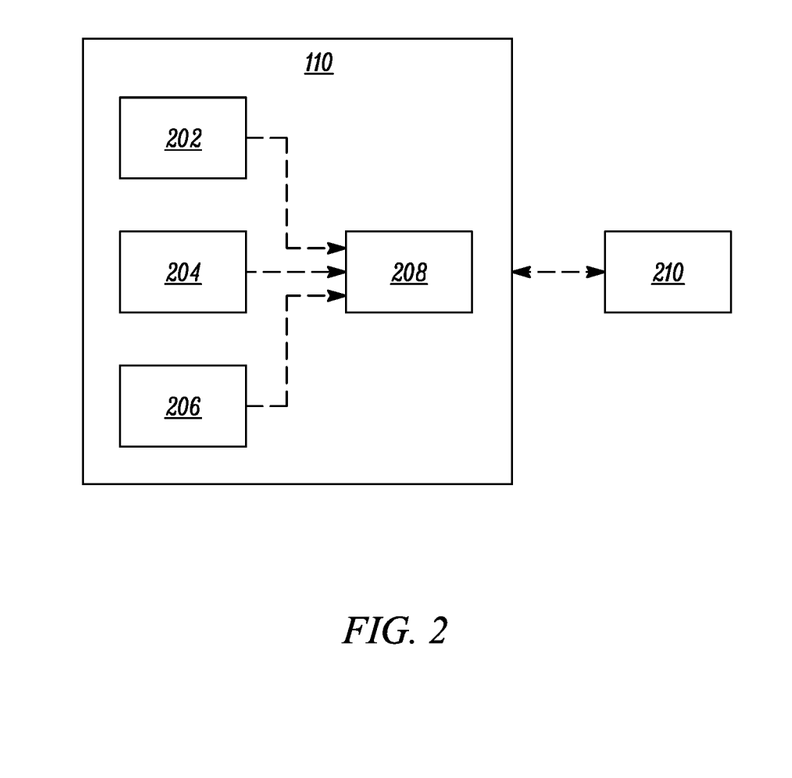
FIG. 2 is a block diagram of a braking system for controlling braking of a machine, according to one implementation of the present disclosure.

FIG. 2 illustrates a block diagram of the braking system 110 for controlling the braking of the machine 100, according to an embodiment of the present disclosure. As illustrated in FIG. 2, the braking system 110 may include a first set of sensors 202, a second set of sensors 204, a receiving unit 206, and a controller 208. The first set of sensors 202, the second set of sensors 204, and the receiving unit 206 may be in an operable communication with the controller 208.

In some implementations, the first set of sensors 202 may be configured to detect a first set of information. The first set of information may indicate operational characteristics of the engine 114 and the transmission system 116 of the machine 100. In some implementations, the first set of sensors 202 may include, but not limited to, a pressure sensor, a temperature sensor, a displacement sensor, and/or the like. In some implementations, the first set of sensors 202 may include, but not limited to, engine speed sensors, transmission input speed sensors, transmission output speed sensors, gear position sensors, cylinder pressure sensors, exhaust port pressure sensors, and/or the like. Further, the first set of information may include, but not limited to, an intake manifold pressure, a cylinder pressure "$P_C$", an exhaust port pressure "$P_E$", a coolant temperature, an inlet temperature, an outlet temperature, an engine speed, a transmission input speed, a transmission output speed, a gear position, an engine load "L", a valve displacement, and/or the like. For example, the exhaust port pressure sensors, for detecting the exhaust port pressure "$P_E$", may be disposed adjacent to an exhaust port (not shown), and not in the exhaust port in order to avoid any malfunctioning of the exhaust port pressure sensors due to high temperature in the exhaust port.

In some implementations, the second set of sensors 204 may be configured to detect a second set of information. The second set of information may indicate a load of the machine 100 and a profile of a work surface 112 (shown in FIG. 1), also referred to as ground surface 112, when the machine 100 is travelling on the predefined route along the work surface 112. The profile of the work surface 112 may include characteristics of the work surface 112, such as an outline or a contour of the work surface 112. In some implementations, the second set of sensors 204 may include, but not limited to, at least one of a payload sensor 602 (shown in FIG. 6), a grade sensor 604, an other grade sensor 606 (shown in FIG. 6), and/or the like. The payload sensor 602 may be configured to detect the load carried by, moved by, or otherwise bearing on the machine 100. Further, the grade sensor 604 and the other grade sensor 606 of the second set of sensors 204 may be configured to detect at least one of a position or an orientation of the machine 100 with respect to the ground surface 112. In some implementations, the second set of sensors 204 may include multiple grade sensors 604 and 606.

Further, the receiving unit 206 of the braking system 110 may be configured to receive a third set of information. The third set of information may indicate a predefined route of the machine 100. In some implementations, the receiving unit 206 may receive the third set of information from at least one of Global Positioning System (GPS) (not shown) or the route planning system 106.

The first set of information, the second set of information, and/or the third set of information may be detected or received by the first set of sensors 202, the second set of sensors 204, and the receiving unit 206, respectively, and may be forwarded to the controller 208 for use in controlling the braking of the machine 100. The constructional and operational characteristics of the controller 208 are explained in detail in the description of FIG. 3.

The controller 208 may further be in communication with an output device 210. The controller 208 may share information pertaining to the controlling of the braking of the machine 100 with an operator through the output device 210. In some implementations, the output device 210 may be an audio device. In some implementations, the output device 210 may be a video device (e.g., a display). In some implementations, the output device 210 may be an audio-video device. The number of components (of the braking system 110) shown in FIG. 2 is provided for explanatory purposes. In practice, there may additional components, fewer components, different components, or differently arranged components than those shown in FIG. 2.

Figure 3:
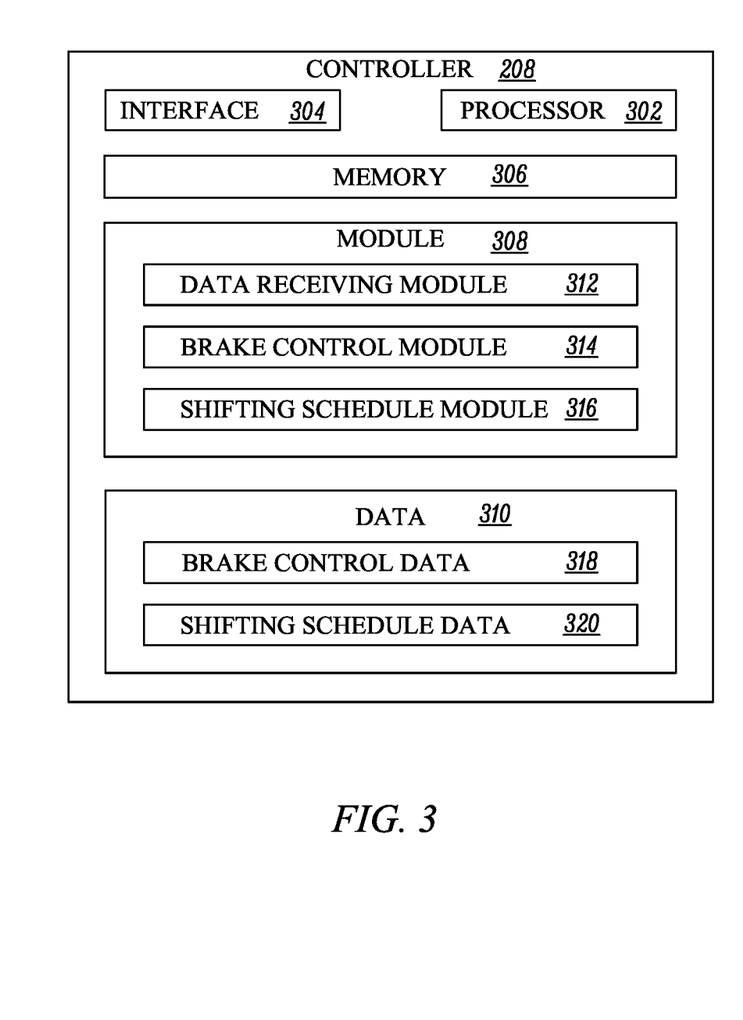
FIG. 3 is a block diagram of a controller of the braking system, according to one implementation of the present disclosure.

FIG. 3 illustrates a block diagram of the controller 208 of the braking system 110, according to an embodiment of the present disclosure. Referring to FIG. 2 and FIG. 3, the controller 208 may include a processor 302, an interface 304, and a memory 306 coupled to the processor 302. The processor 302 may be configured to fetch and execute computer readable instructions stored in the memory 306. In some implementations, the processor 302 may be implemented as one or more microprocessors, microcomputers, microcontrollers, digital signal processors, central processing units, state machine, logic circuitries or any devices that manipulate signals based on operational instructions.

The interface 304 may facilitate multiple communications within wide variety of communication protocol(s) and network(s), including wired network(s) and/or wireless network(s). Further, the interface 304 may include a variety of software and hardware interfaces. In some implementations, the interface 304 may include, but not limited to, peripheral devices, such as a keyboard, a mouse, an external memory, and/or a printer. The interface 304 may facilitate multiple communications within wide variety of communication protocol(s) and network(s), as explained above. For example, the interface 304 may include one or more ports for connecting the controller 208 and, therefore, connecting the braking system 110 to the output device 210.

In some implementations, the memory 306 may include any non-transitory computer-readable medium. In one example, the non-transitory computer-readable medium may be a volatile memory, such as static random access memory and a non-volatile memory, such as read-only memory, erasable programmable ROM, and flash memory.

The controller 208 may include modules 308 and data 310. The modules 308 may include hardware and/or software (routines, programs, objects, components, and data structures) which perform particular tasks or implement particular data types (e.g., with respect to controlling braking of the machine 100). In some implementations, the modules 308 may include a data receiving module 312, a brake control module 314, and a shifting schedule module 316. The data 310 may be included in a repository for storing data processed, received, and generated by one or more of the modules 308. The data 310 may include a brake control data 318 and a shifting schedule data 320.

The number of components (of the controller 208) shown in FIG. 3 is provided for explanatory purposes. In practice, there may additional components, fewer components, different components, or differently arranged components than those shown in FIG. 3.

The data receiving module 312 may be configured to receive the first set of information, the second set of information, and the third set of information from the first set of sensors 202, the second set of sensors 204, and/or the receiving unit 206, respectively. In some implementations, details pertaining to the data receiving module 312 may be stored in the brake control data 318. In some implementations, details pertaining to the data receiving module 312 may be stored in the shifting schedule data 320. In some implementations, such details may include, but not limited to, the first set of information, the second set of information, and/or the third set of information.

Figure 4A:
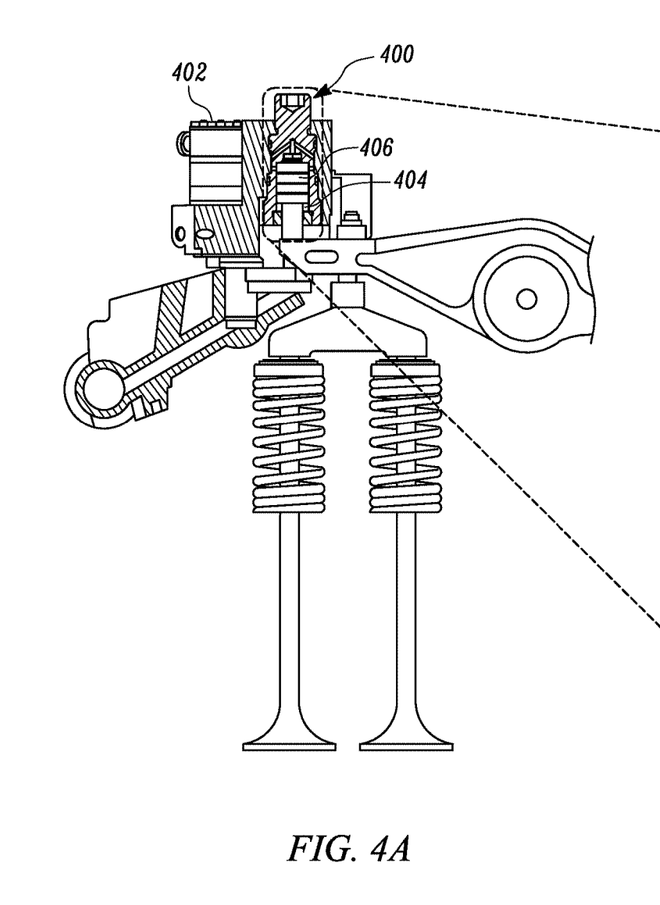
FIG. 4A is a cross-sectional view of an actuator associated with an engine of the machine, according to one implementation of the present disclosure.

The brake control module 314 may be configured to control an actuator 400 (shown in FIG. 4) disposed in the engine 114. FIG. 4A illustrates a cross-sectional view of the actuator 400 disposed in a portion of the engine 114, according to an embodiment of the present disclosure. FIG.

4B illustrates a blown-up view of the actuator 400 of FIG. 4A, according to an embodiment of the present disclosure. In some implementations, FIG. 4A and FIG. 4B may be collectively referred to as FIG. 4 in the present disclosure, without departing from the scope of the present disclosure.

Figure 4B:
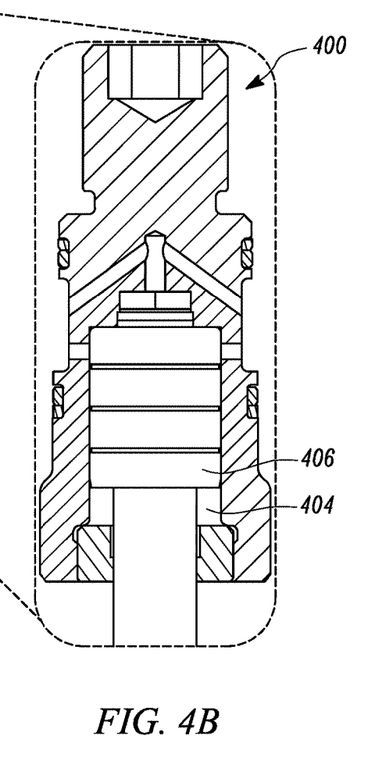
FIG. 4B is a blown-up view of the actuator of FIG. 4A, according to one implementation of the present disclosure.

Referring to FIG. 4A and FIG. 4B, in some implementations, the actuator 400 may be an electronic-hydraulic valve. In some implementations, the actuator 400 may be disposed to control a lift (also referred to as a lift distance) of an exhaust valve 402 positioned at an inlet (not shown) of the exhaust port. The exhaust valve 402 may control a flow rate and quantity of exhaust gases exiting the machine 100.

As illustrated in FIG. 4A and FIG. 4B, the actuator 400 may include a chamber 404 and a piston 406 moving in a reciprocating manner within the chamber 404. The actuator 400 may also include a high pressure fluid within the chamber 404 enabling the reciprocating movement of the piston 406. The reciprocating movement of the piston 406 may control the lift distance of the exhaust valve 402. The number of components (of the actuator 400) shown in FIG. 4 is provided for explanatory purposes. In practice, there may additional components, fewer components, different components, or differently arranged components than those shown in FIG. 4.

Referring to FIG. 3 and FIG. 4, the brake control module 314 may be configured to control the actuator 400 to lift the exhaust valve 402 and therefore, open and close the exhaust port for engine braking. The brake control module 314 may control the actuator 400 based on the first set of information, the second set of information, and/or the third set of information received by the data receiving module 312.

In some implementations, when the brake control module 314 actuates the actuator 400 before an engine exhaust stroke to release the compressed gases, the high pressure fluid may push the piston 406 to lift the exhaust valve 402. A stroke of the piston 406 may determine the lift distance of the exhaust valve 402. Further, the lift distance of the exhaust valve 402 may directly be proportional to the flow rate and the quantity of the compressed gases exiting the machine 100.

In one example, the brake control module 314 may determine an overall pitch of the machine 100 on the predefined route and a corresponding grade of the ground surface 112 under the machine 100, based on the second set of information received from the multiple grade sensors 604 and 606 of the second set of sensors 204. Therefore, the second set of information received from the multiple grade sensors 604 and 606 may be utilized to determine the grade of the ground surface 112, by the brake control module 314. The brake control module 314 may then control the actuator 400 based on the grade of the ground surface 112. In some implementations, the first set of information, the second set of information, and/or the third set of information may be used for updating the predefined route of the machine 100, for example, if the grade of the ground surface 112 is found to be inaccessible for the machine 100. In some implementations, details pertaining to the brake control module 314 may be stored in the brake control data 318. In some implementations, the details may include, but not limited to, the lift of the exhaust valve 402, the overall pitch of the machine 100, and the grade of the ground surface 112.

Further, the shifting schedule module 316 may be configured to control a plurality of valves 500 (shown in FIG. 5 and individually referred to as valve 500), disposed in the transmission system 116. In some implementations, the machine 100 may include one valve 500, from the plurality of valves 500, for each of the gears in the transmission system 116. For example, for 5 gears in the transmission system 116, the machine 100 may include 5 valves 500. Each valve 500 may be utilized for engaging or disengaging one gear of the transmission system 116. For the sake of brevity, the present disclosure is explained with regard to one valve 500, from the plurality of valves 500, which would be equally applicable to other valves 500 as well, without departing from the scope of the present disclosure.

Figure 5:
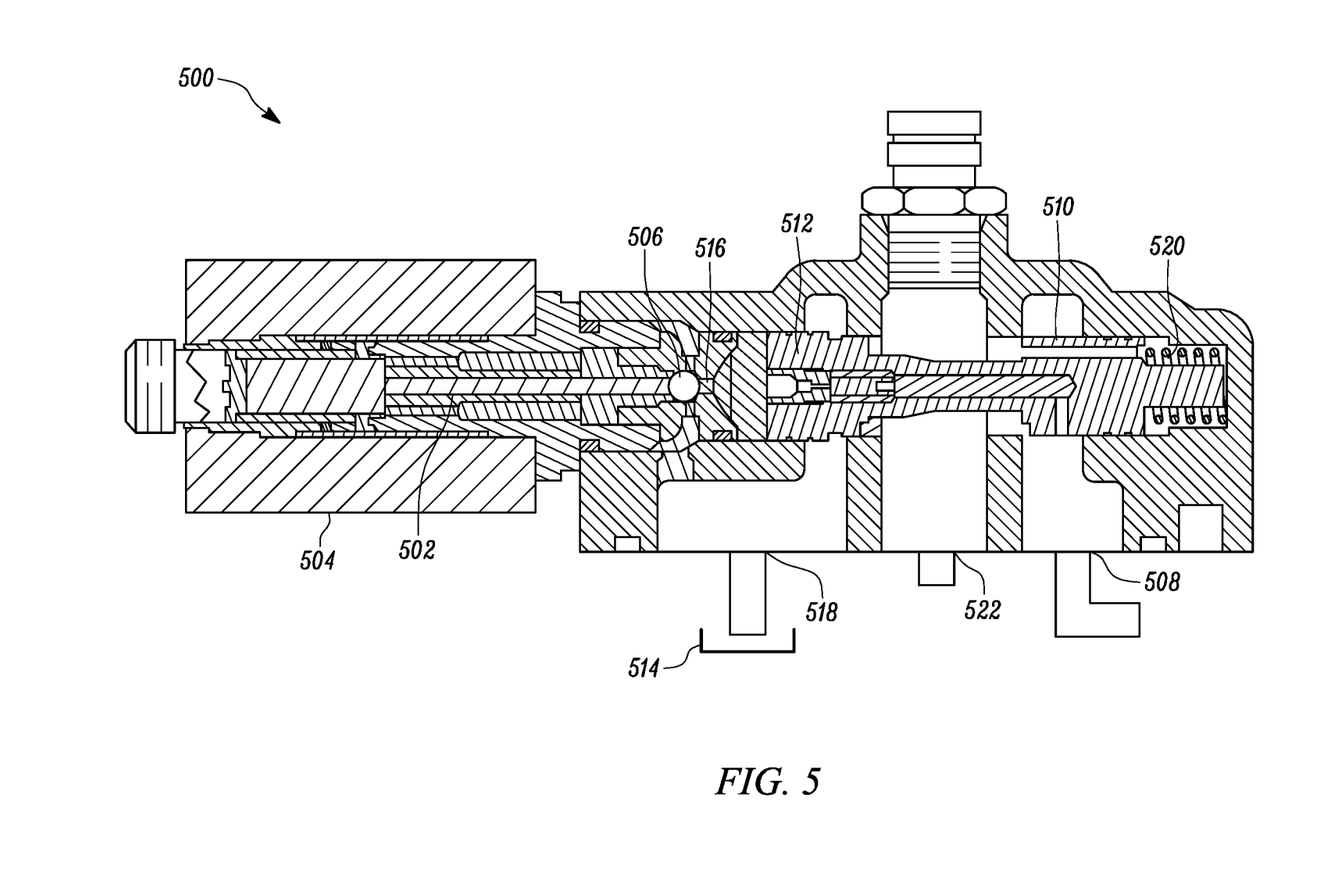
FIG. 5 is a cross-sectional view of a valve associated with a transmission system of the machine, according to one implementation of the present disclosure.

FIG. 5 illustrates a cross-sectional view of the valve 500 disposed in the transmission system 116, according to an embodiment of the present disclosure. In some implementations, the valve 500 may be an electronic-hydraulic valve. In some implementations, the valve 500 may be an Electronic Clutch Pressure Control (ECPC) valve. Referring to FIG. 3 and FIG. 5, the shifting schedule module 316 may control the valve 500 to achieve the predetermined gear-ratio during the engine braking. In particular, the shifting schedule module 316 may control the valve 500 to achieve a desired clutch engagement during the engine braking. In some implementations, the predetermined gear-ratio may indicate an amount of work or energy absorbed by the engine 114 during the engine braking. In some implementations, the shifting schedule module 316 may control a shift from a current gear-ratio to the predetermined gear-ratio by releasing a clutch enabling the current gear-ratio, and then by applying another clutch to achieve the predetermined gear-ratio. The shifting schedule module 316 may control the valve 500 based on the first set of information, the second set of information, and/or the third set of information.

In some implementations, the valve 500 may include a pin 502, a solenoid 504 wrapped around the pin 502, and a ball 506 coupled to the pin 502. In some implementations, the solenoid 504 may be made of copper wire wrapped around the pin 502. The solenoid 504 may generate a magnetic field when energized. Based on the magnetic field, the pin 502 may move in a linear motion.

The valve 500 may control a pressure of oil which may further be transmitted to the clutch for achieving the predetermined gear-ratio. In some implementations, the controller 208 may communicate with an Engine Control Module (ECM) (not shown) to transmit a signal, for example, a Pulse Width Modulated (PWM) signal, to the solenoid 504 of the valve 500. An amount of current that may be sent to the valve 500 may regulate the pressure of the oil that is supplied to the clutch. In some implementations, the amount of current may be directly proportional to the pressure of the oil.

In operation, a transmission pump (not shown) may supply pressurized oil to the valve 500 through an oil supply port 508. Further, the oil with a pilot pressure may be forwarded to a chamber 512 through a valve spool 510. In some implementations, the oil in the chamber 512 may be allowed to drain to an oil reservoir 514 through an orifice 516 and a drain port 518. The number of components (of the valve 500) shown in FIG. 5 is provided for explanatory purposes. In practice, there may additional components, fewer components, different components, or differently arranged components than those shown in FIG. 5.

For achieving the predetermined gear-ratio, the shifting schedule module 316 may communicate with the ECM to transmit a signal to the solenoid 504. When the solenoid 504 gets energized, the pin 502 may move in the linear motion forcing the ball 506 against the orifice 516. As a result, the pressure of the oil in the chamber 512 may be increased. Due to the increase in the pressure, the valve spool 510 may move against a spring 520. The pressurized oil may then be allowed to flow to the clutch through a clutch fill port 522.

When the solenoid 504 is de-energized, the pressure of the oil in the chamber 512 may displace the ball 506. The oil in the chamber 512 may then be allowed to drain to the oil reservoir 514 through the orifice 516 and the drain port 518. As the pressure in the chamber 512 drops, the valve spool 510 may move away from the spring 520, by the force of the spring 520. Due to this reverse movement of the valve spool 510, the supply of the oil from the oil supply port 508 may be blocked. Further, the oil in the clutch may be allowed to flow to the oil reservoir 514 through the drain port 518. In some implementations, details pertaining to the shifting schedule module 316 may be stored in the shifting schedule data 320. In some implementations, such details may include, but not limited to, the desired clutch engagement, the predetermined gear-ratio, and the current gear-ratio.

In some implementations, the controller 208 may be configured to control the actuator 400 and the valve 500 based on predefined maps. The predefined maps may be developed during a calibration process of the engine 114 and the transmission system 116. In some implementations, the predefined maps may be developed for controlling the actuator 400 and the valve 500 based on the first set of information, the second set of information, and/or the third set of information. For example, for each value or combination of values of the first set of information, the second set of information, and/or the third set of information, the predefined maps may be generated for controlling the actuator 400 and the valve 500. The predefined maps may indicate, but not limited to, a gear-ratio, a gear in which the machine 100 has to operate in, a rate of opening of the exhaust valve 402, the lift distance of the exhaust valve 402, a duration of opening or closing of the exhaust valve 402, the amount of current to be supplied to the valve 500, and/or the like.

Figure 6:
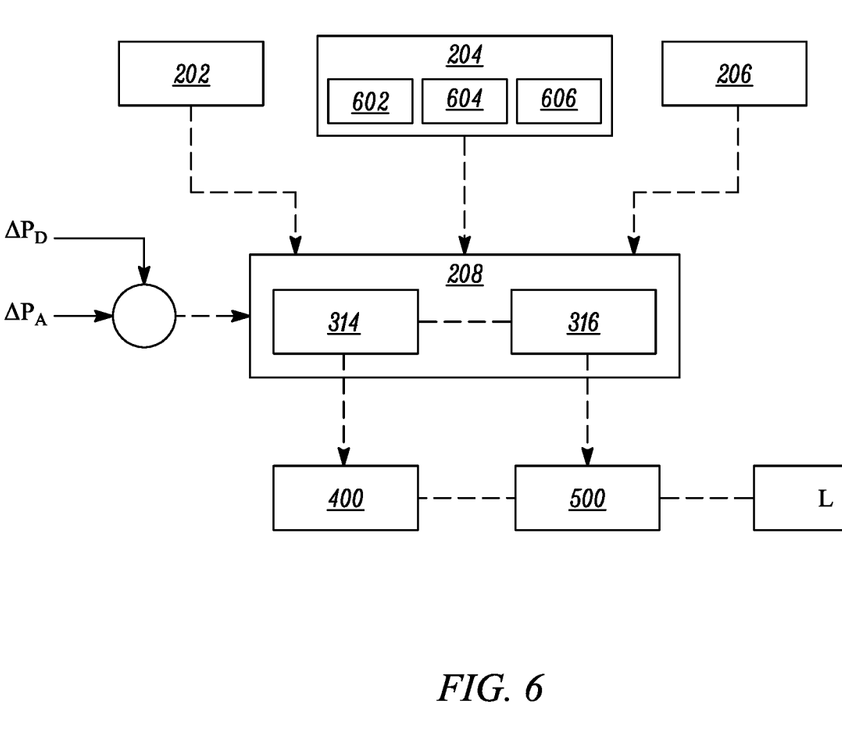
FIG. 6 is a block diagram of the braking system, according to one implementation of the present disclosure.

FIG. 6 illustrates a block diagram of the braking system 110, according to an embodiment of the present disclosure. For the sake of brevity, some aspects of the present disclosure which are already explained in detail in the description of FIG. 1, FIG. 2, FIG. 3, FIG. 4, and FIG. 5 are not explained in the description of FIG. 6.

The controller 208 may receive the first set of information, the second set of information, and the third set of information from the first set of sensors 202, the second set of sensors 204, and the receiving unit 206, respectively. The first set of information may include details pertaining to the operational and constructional characteristics of the engine 114 and the transmission system 116 of the machine 100. The second set of information may include details pertaining to the grade and the payload of the machine 100. For detecting such details, the second set of sensors 204 may include, but not limited to, a payload sensor 602, the grade sensor 604 for a rear drive axis (not shown) of the machine 100, the other grade sensor 606 for front drive axis (not shown) of the machine 100, and/or the like. The third set of information may include haulage route information of the machine 100.

In some implementations, based on the first set of information, the second set of information, and/or the third set of information, the controller 208 may determine at least one of a starting point for the engine braking or the gear-ratio for the predefined route. The brake control module 314 of the controller 208 may control the actuator 400, before the engine exhaust stroke, for further controlling the lift distance of the exhaust valve 402 to open and close the exhaust port for the engine braking. Similarly, based on the first set of information, the second set of information, and/or the third set of information, the shifting schedule module 316 may control the valve 500.

In some implementations, the controller 208 may control the valve 500 by using dither signals. The dither signals may keep an armature (not shown) of the solenoid 504 in micro-motion. A dynamic friction may replace a static friction of the valve 500 with the help of the dither signals.

Figure 7:
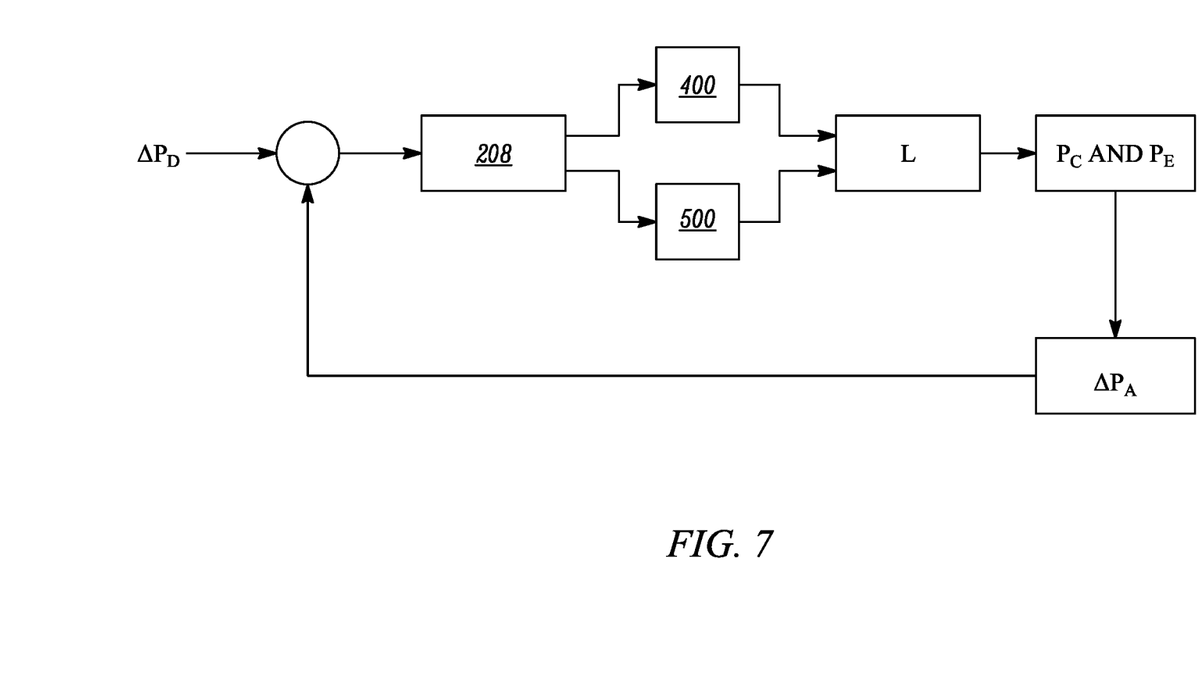
FIG. 7 is a block diagram depicting the controlling of the actuator and the valve by the braking system, according to one implementation of the present disclosure.

FIG. 7 illustrates a block diagram depicting the controlling of the actuator 400 and the valve 500, according to an embodiment of the present disclosure. For the sake of brevity, some aspects of the present disclosure which are already explained in detail in the description of FIG. 1, FIG. 2, FIG. 3, FIG. 4, FIG. 5, and FIG. 6 are not explained in the description of FIG. 7.

In some implementations, the controller 208 may receive values of the cylinder pressure "$P_C$" and the exhaust port pressure "$P_E$" as the first set of information from the first set of sensors 202. Based on the cylinder pressure "$P_C$" and the exhaust port pressure "$P_E$", the controller 208 may determine an actual pressure difference "$\Delta P_A$". The actual pressure difference "$\Delta P_A$" may indicate an actual engine braking load "L", also referred to as real-time engine braking load. In some implementations, the controller 208 may determine a braking load, a thermal stress, and a mechanical stress based on the actual pressure difference "$\Delta P_A$" and the operational characteristics of the engine 114 and the transmission system 116.

Further, the controller 208 may determine a desired pressure difference "$\Delta P_D$" between the cylinder pressure "$P_C$" and the exhaust pressure. The desired pressure difference "$\Delta P_D$" may indicate a desired engine braking load during the engine braking. In some implementations, the desired pressure difference "$\Delta P_D$" may be determined during the calibration process conducted for the engine 114 and the transmission system 116 for different operational conditions of the machine 100. In some implementations, the controller 208 may determine the desired pressure difference "$\Delta P_D$", based on the first set of information, the second set of information, and/or the third set of information.

The controller 208 may then compare the actual pressure difference "$\Delta P_A$" and the desired pressure difference "$\Delta P_D$". Based on the comparison, the controller 208 may control the actuator 400 and the valve 500 for controlling the braking of the machine 100. In some implementations, when the actual pressure difference "$\Delta P_A$" is less than the desired pressure difference "$\Delta P_D$", the controller 208 may control the actuator 400 to reduce the lift distance of the exhaust valve 402. Further, the controller 208 may control the valve 500 to switch to a higher gear. In other implementations, when the actual pressure difference "$\Delta P_A$" is greater than the desired pressure difference "$\Delta P_D$", the controller 208 may control the actuator 400 to increase the lift distance of the exhaust valve 402. Further, the controller 208 may control the valve 500 to switch to a lower gear. In some implementations, when the actual pressure difference "$\Delta P_A$" is equal to the desired pressure difference "$\Delta P_D$", the controller 208 may control the actuator 400 to maintain the same lift distance of the exhaust valve 402. In such implementations, the controller 208 may control the valve 500 to maintain the same gear.

In some implementations, the controller 208 may control the actuator 400 and the valve 500 for adjusting the engine braking load "L". In some implementations, when the controller 208 controls the valve 500 for changing from a high gear to a lower gear in the transmission system 116, the engine braking load "L" may be increased. Further, the controller 208 may control the actuator 400 in such a manner that the thermal stress as well as the mechanical stress may be reduced.

In one implementation, the controller 208 may forward the information to the operator through the output device 210. The information may include, but not limited to, the first set of information, the second set of information, the third set of information, information regarding the lift of the exhaust valve 402, information regarding the overall pitch of the machine 100, information regarding the grade of the ground surface 112, information regarding the desired clutch engagement, the predetermined gear-ratio, and/or the current gear-ratio.

INDUSTRIAL APPLICABILITY

The present disclosure relates to the braking system 110 and a method 800 for controlling the braking of the machine 100, according to some implementations of the present disclosure. The braking system 110 may include the first set of sensors 202, the second set of sensors 204, the receiving unit 206, and the controller 208. The first set of sensors 202 may be disposed in the engine 114 and the transmission system 116 of the machine 100. The second set of sensors 204 may be disposed in the machine 100, for example, on a chassis, a rear axle, and/or a front axle. The controller 208 may be a part of the ECM of the machine 100. In other implementations, the controller 208 may be a separate component disposed onboard the machine 100, and in communication with the first set of sensors 202, the second set of sensors 204, the receiving unit 206, and the ECM.

Therefore, the braking system 110 may be disposed onboard the machine 100. The braking system 110 may further be in communication with other systems disposed in the central monitoring station, for example, the route planning system 106, over the network 108. The braking system 110 may be disposed in any machine or vehicle for controlling the braking of the machine or vehicle (e.g., machine 100), with few changes in order to accommodate the operational and constructional features of the machine 100, without departing from the scope of the present disclosure.

Figure 8:
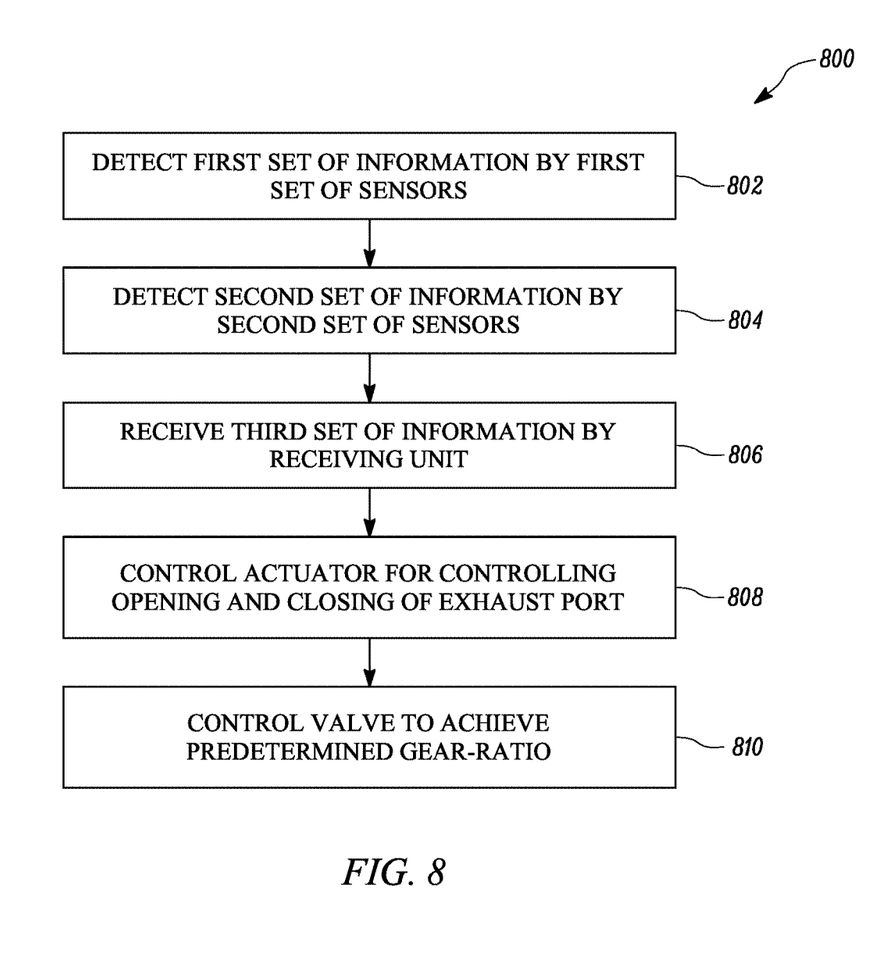
FIG. 8 is a flowchart for a method for controlling braking of the machine, according to one implementation of the present disclosure.

FIG. 8 illustrates a flowchart for the method 800 for controlling the braking of the machine 100, according to an embodiment of the present disclosure. For the sake of brevity, some aspects of the present disclosure which are already explained in detail in the description of FIG. 1, FIG. 2, FIG. 3, FIG. 4, FIG. 5, FIG. 6, and FIG. 7 are not explained in the description of FIG. 8.

At block 802, the method 800 may include detecting the first set of information. The first set of information may indicate the operational characteristics of the engine 114 and the transmission system 116. In some implementations, the first set of sensors 202 of the braking system 110 may detect the first set of information. The first set of sensors 202 may include, but not limited to, the pressure sensor, the temperature sensor, the displacement sensor, and/or the like.

At block 804, the method 800 may include detecting the second set of information. The second set of information may indicate the load of the machine 100 and the profile of the ground surface 112, while the machine 100 is traveling on the predefined route. In some implementations, the second set of sensors 204 of the braking system 110 may detect the second set of information. The second set of sensors 204 may include, but not limited to, the payload sensor 602, the grade sensor 604, the other grade sensor 606, and/or the like.

At block 806, the method 800 may include receiving the third set of information. The third set of information may indicate the predefined route of the machine 100. In some implementations, the receiving unit 206 of the braking system 110 may receive the third set of information. In some implementations, the third set of information may be received from at least one of the GPS or the route planning system 106.

At block 808, the method 800 may include controlling the actuator 400 to control the lift distance of the exhaust valve 402 for controlling the opening and closing of the exhaust port before the engine exhaust stroke for the engine braking. The actuator 400 may be disposed in the engine 114. The actuator 400 may be controlled based on the first set of information, the second set of information, and/or the third set of information. The controller 208 of the braking system 110 may control the actuator 400.

At block 810, the method 800 may include controlling the valve 500 to achieve the predetermined gear-ratio during the engine braking. The valve 500 may be disposed in the transmission system 116. The valve 500 may be controlled based on the first set of information, the second set of information, and/or the third set of information. In some implementations, the controller 208 of the braking system 110 may control the valve 500.

In some implementations, the method 800 further includes comparing the actual pressure difference "$\Delta P_A$" (between the cylinder pressure "$P_C$" and the exhaust port pressure "$P_E$") and the desired pressure difference "$\Delta P_D$" (between the cylinder pressure "$P_C$" and the exhaust port pressure "$P_E$"). The actual pressure difference "$\Delta P_A$" and the desired pressure difference "$\Delta P_D$" may indicate the actual engine braking load and the desired engine braking load, respectively. Further, the method 800 may include controlling the actuator 400 and the valve 500 based on the comparison of the actual pressure difference "$\Delta P_A$" and the desired pressure difference "$\Delta P_D$". In some implementations, the method 800 includes controlling the actuator 400 and the valve 500 based on the predefined maps developed during the calibration process of the engine 114 and the transmission system 116.

The braking system 110 and the method 800 of the present disclosure offer a comprehensive approach for controlling the braking of the machine 100. The engine braking may assist in reducing the use of existing brakes, minimize brake wear, and eliminate the possibility of failures. Further, the braking system 110 may include few components and, therefore, may be implemented in the machine 100 without making significant changes in the already existing construction of the machine 100. This would result in a significant reduction in the cost associated with installing, operation, and maintenance of the braking system 110 for controlling the braking of the machine 100.

Further, since the braking system 110 may ensure that the machine 100 has the predetermined gear-ratio during the engine braking, a slippage of a clutch pad and consequent heat generation may be avoided. Also, a smooth and comfortable operating and braking experience may be ensured for the machine 100. Owing to the elimination of the possibilities of jerks and instability in the machine 100, overloading and damage to the components of the machine 100 may be avoided resulting in an improved service life and an improved performance of the machine 100 may be achieved. Further, an overall fuel efficiency of the engine 114 may also be significantly improved on account of a suitable selection of the gear-ratio and better driving experience.

In addition, the braking system 110 may control the actuator 400 and the valve 500 for adjusting the load of the engine braking. As a result, possibilities of overloading of the engine 114 or extra wearing of components of the engine 114 during the engine braking may be avoided. The engine braking load "L" on the engine 114 may be adjusted such that the service life of the engine 114 is not negatively impacted during the engine braking. The braking system 110 may reduce the mechanical stress by adjusting the engine braking load "L" during the engine braking, while maintaining a reduction in the thermal stress that is introduced due to Joules-Thomson effect. The braking system 110 may control the lift of the exhaust valve 402 by controlling the actuator 400 in such a manner that the mechanical stress as well as the thermal stress is significantly reduced. Therefore, the present disclosure offers the braking system 110 and the method 800 for controlling the braking of the machine 100 that are simple, effective, economical, flexible, and time saving.

While aspects of the present disclosure have been particularly shown and described with reference to the implementations above, it will be understood by those skilled in the art that various additional implementations may be contemplated by the modification of the disclosed machines, systems and methods without departing from the spirit and scope of what is disclosed. Such implementations should be understood to fall within the scope of the present disclosure as determined based upon the claims and any equivalents thereof. No element, act, or instruction used herein should be construed as critical or essential unless explicitly described as such. Also, as used herein, the articles "a" and "an" are intended to include one or more items, and may be used interchangeably with "one or more". Furthermore, as used herein, the term "set" is intended to include one or more items, and may be used interchangeably with "one or more".

What is claimed is:

1. A braking system for controlling braking of a machine, the braking system comprising:
    a first set of sensors configured to detect a first set of information,
        the first set of information indicating operational characteristics of an engine and a transmission system of the machine;
    a second set of sensors configured to detect a second set of information,
        the second set of information indicating a load of the machine and a profile of a work surface; a receiving unit configured to receive a third set of information,
        the third set of information indicating a predefined route of the machine; and
    a controller in communication with the first set of sensors, the second set of sensors, and the receiving unit,
        the controller being configured to:
            control an actuator disposed in the engine,
                the actuator being configured to open and close an exhaust port for engine braking; and
            control a valve disposed in the transmission system, and
        when controlling the valve, the controller being configured to:
            determine a gear-ratio, for the predefined route, based on one or more of the first set of information, the second set of information, or the third set of information, and
            control the valve based on the gear-ratio for the predefined route.

2. The braking system of claim 1, wherein the controller comprises:
    a brake control module configured to control the actuator, and
    a shifting schedule module configured to control the valve.

3. The braking system of claim 1,
    wherein the controller is further configured to:
        identify, based on the first set of information, a cylinder pressure value and an exhaust port pressure value;
        determine an actual pressure difference based on the cylinder pressure value and the exhaust port pressure value; and
        compare the actual pressure difference and a desired pressure difference, wherein, when controlling the actuator, the controller is to:
            control the actuator based on comparing the actual pressure difference the desired pressure difference, and
    wherein the actual pressure difference and the desired pressure difference indicate an actual engine braking load and a desired engine braking load, respectively.

4. The braking system of claim 1,
    wherein the controller is configured to control the actuator and the valve based on predefined maps developed during a calibration process of the engine and the transmission system, and
    wherein the predefined maps indicate at least one of a gear in which the machine has to operate in, a rate of opening of an exhaust valve, a lift distance of the exhaust valve, a duration of opening or closing of the exhaust valve, or an amount of current to be supplied to the valve.

5. The braking system of claim 1, wherein the first set of sensors includes at least one of a pressure sensor, a temperature sensor, or a displacement sensor.

6. The braking system of claim 1, wherein the second set of sensors includes at least one of a grade sensor or a payload sensor.

7. The braking system of claim 1, wherein the third set of information is received from at least one of a Global Positioning System (GPS) or a route planner.

8. The braking system of claim 1, wherein the machine is an autonomous truck operating at a work site.

9. The braking system of claim 1, wherein the actuator and the valve are electronic-hydraulic valves.

10. A method for controlling braking of a machine, the method comprising:
    detecting, by a first set of sensors, a first set of information,
        the first set of information indicating operational characteristics of an engine and a transmission system of the machine;
    detecting, by a second set of sensors, a second set of information,
        the second set of information indicating a load of the machine and a profile of a work surface; receiving, by a receiving unit, a third set of information,
        the third set of information indicating a predefined route of the machine;
    controlling, by a controller, an actuator for controlling opening and closing of an exhaust port for engine braking,
        the actuator being disposed in the engine;

determining, by the controller, a gear-ratio, for the predefined route, based on one or more of the first set of information, the second set of information, or the third set of information; and controlling, by the controller, a valve based on the gear-ratio for the predefined route, the valve being disposed in the transmission system.

11. The method of claim 10, further comprising:

identifying, based on the first set of information, a cylinder pressure value and an exhaust port pressure value;

determining an actual pressure difference based on the cylinder pressure value and the exhaust port pressure value; and comparing the actual pressure difference and a desired pressure difference, wherein the actual pressure difference and the desired pressure difference indicate an actual engine braking load and a desired engine braking load, respectively, and wherein controlling the actuator comprises:

controlling the actuator based on comparing the actual pressure difference and the desired pressure difference.

12. The method of claim 10, wherein the actuator and the valve are controlled based on predefined maps developed during a calibration process of the engine and the transmission system, and wherein the predefined maps indicate at least one of a gear in which the machine has to operate in, a rate of opening of an exhaust valve, a lift distance of the exhaust valve, a duration of opening or closing of the exhaust valve, or an amount of current to be supplied to the valve.

13. The method of claim 10, wherein the first set of sensors includes at least one of a pressure sensor, a temperature sensor, or a displacement sensor.

14. The method of claim 10, wherein the second set of sensors includes at least one of a grade sensor or a payload sensor.

15. The method of claim 10, wherein the third set of information is received from at least one of a Global Positioning System (GPS) or a route planner.

16. A machine comprising:

an engine;

a transmission system coupled to the engine; and a braking system in communication with the engine and the transmission system, the braking system comprising:

a first set of sensors configured to detect a first set of information, the first set of information indicating operational characteristics of the engine and the transmission system;

a second set of sensors configured to detect a second set of information, the second set of information indicating a load of the machine and a profile of a work surface;

a receiving unit configured to receive a third set of information, the third set of information indicating a predefined route of the machine; and a controller in communication with the first set of sensors, the second set of sensors, and the receiving unit, the controller being configured to:

determine a gear-ratio, for the predefined route, based on one or more of the first set of information, the second set of information, or the third set of information, and control a valve, disposed in the transmission system, based on the gear-ratio for the predefined route.

17. The machine of claim 16, wherein the controller is further configured to:

control an actuator, disposed in the engine, based on a comparison between an actual pressure difference, between a cylinder pressure and an exhaust port pressure, and a desired pressure difference between the cylinder pressure and the exhaust port pressure, and wherein the actual pressure difference and the desired pressure difference indicate an actual engine braking load and a desired engine braking load, respectively.

18. The machine of claim 16, wherein the valve is further controlled based on predefined maps developed during a calibration process of the engine and the transmission system, and wherein the predefined maps indicate at least one of a gear in which the machine has to operate in, a rate of opening of an exhaust valve, a lift distance of the exhaust valve, a duration of opening or closing of the exhaust valve, or an amount of current to be supplied to the valve.

19. The machine of claim 16, wherein the first set of sensors includes at least one of a pressure sensor, a temperature sensor, or a displacement sensor.

20. The machine of claim 16, wherein the second set of sensors includes at least one of a grade sensor or a payload sensor.

* * * * *